United States Patent

[11] 3,583,443

| [72] | Inventors | Robin K. Beckett;<br>Allen J. Moffat, both of Wilmington, Ohio |
|---|---|---|
| [21] | Appl. No. | 867,110 |
| [22] | Filed | Sept. 18, 1969 |
| [45] | Patented | June 8, 1971 |
| [73] | Assignee | I-T-E Imperial Corporation<br>Continuation-in-part of application Ser. No. 726,834, May 6, 1968, now abandoned. |

[54] VALVE WITH HIGHLY SENSITIVE ACTUATING MEANS
23 Claims, 10 Drawing Figs.

[52] U.S. Cl. ............................................. 137/625.63
[51] Int. Cl. ..................................................... F16k 11/07
[50] Field of Search ............................................. 137/625.6,
625.61, 625.63, 625.64, 625.62; 91/25, 26;
251/61.1

[56] References Cited
UNITED STATES PATENTS

| 1,986,084 | 1/1935 | Tolkien | 91/25X |
| 2,572,175 | 10/1951 | McPherson | 251/61.1X |
| 2,625,136 | 1/1953 | Moog | 137/625.61 |
| 2,973,746 | 3/1961 | Jupa | 137/625.63 |
| 3,076,477 | 2/1963 | Brandenberg | 137/625.6 |
| 3,084,676 | 4/1963 | Herion et al. | 137/625.64X |
| 3,304,953 | 2/1967 | Wickline et al. | 137/625.6X |
| 3,340,897 | 9/1967 | Nevulis | 137/625.6 |
| 3,430,656 | 3/1969 | Hawk | 137/625.61 |
| 3,433,266 | 3/1969 | Bidlack | 137/625.61 |
| 3,457,956 | 7/1969 | Andrews | 137/625.61 |

*Primary Examiner*—Henry T. Klinksiek
*Attorney*—Hofyren, Wegner, Allen, Stellman & McCord ABSTRACT: The valve includes an axially shiftable valve spool having end heads and intermediate voids, said voids serving to direct a primary fluid under pressure to a mechanism in either of two directions, depending upon the shift of the spool. The valve body and accessory parts contain passageways, bores, and ducts, which provide for a secondary circuit of fluid bleeding constantly to atmosphere, but serving as the means to shift the valve spool axially in opposite directions.

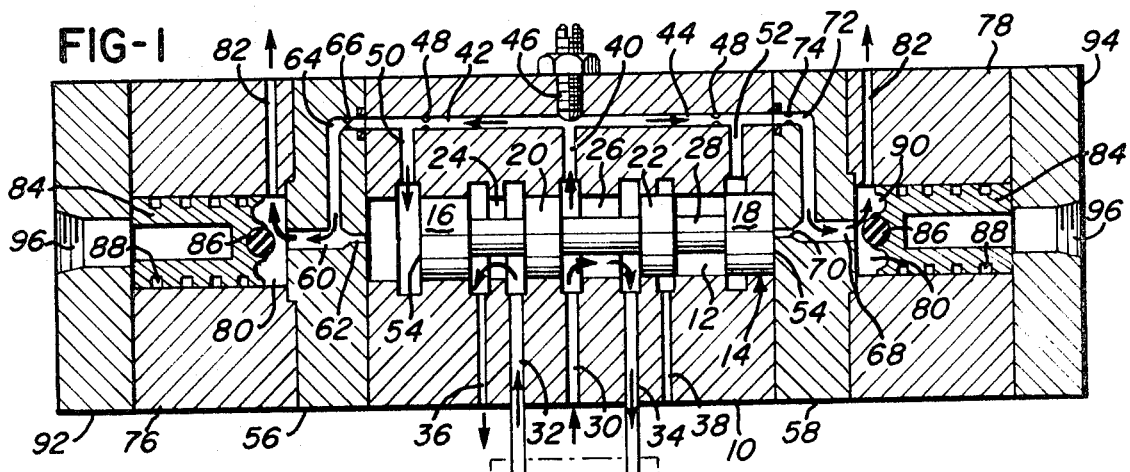
FIG-1
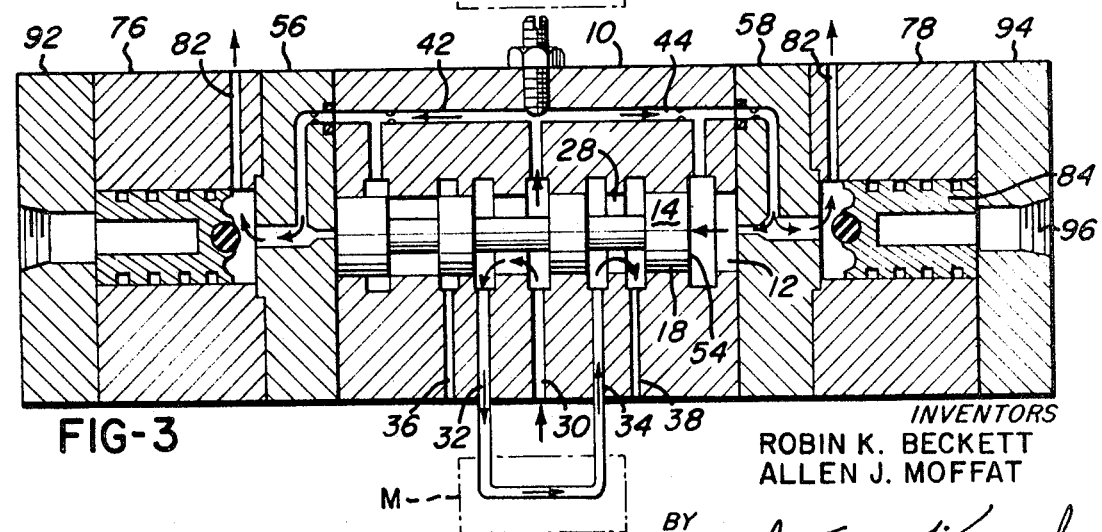
FIG-2
FIG-3
INVENTORS
ROBIN K. BECKETT
ALLEN J. MOFFAT
BY
J. Warren Kinney Jr.
ATTORNEY

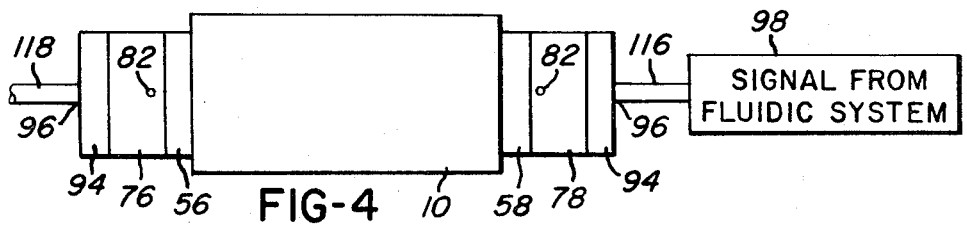
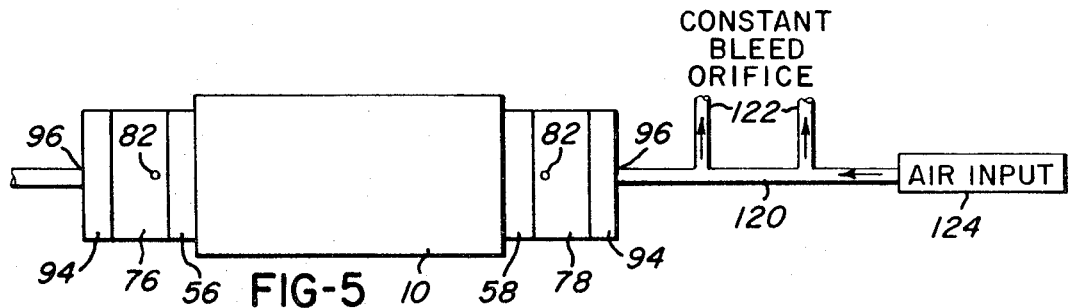
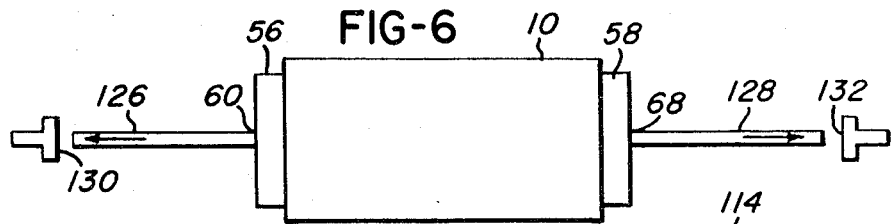
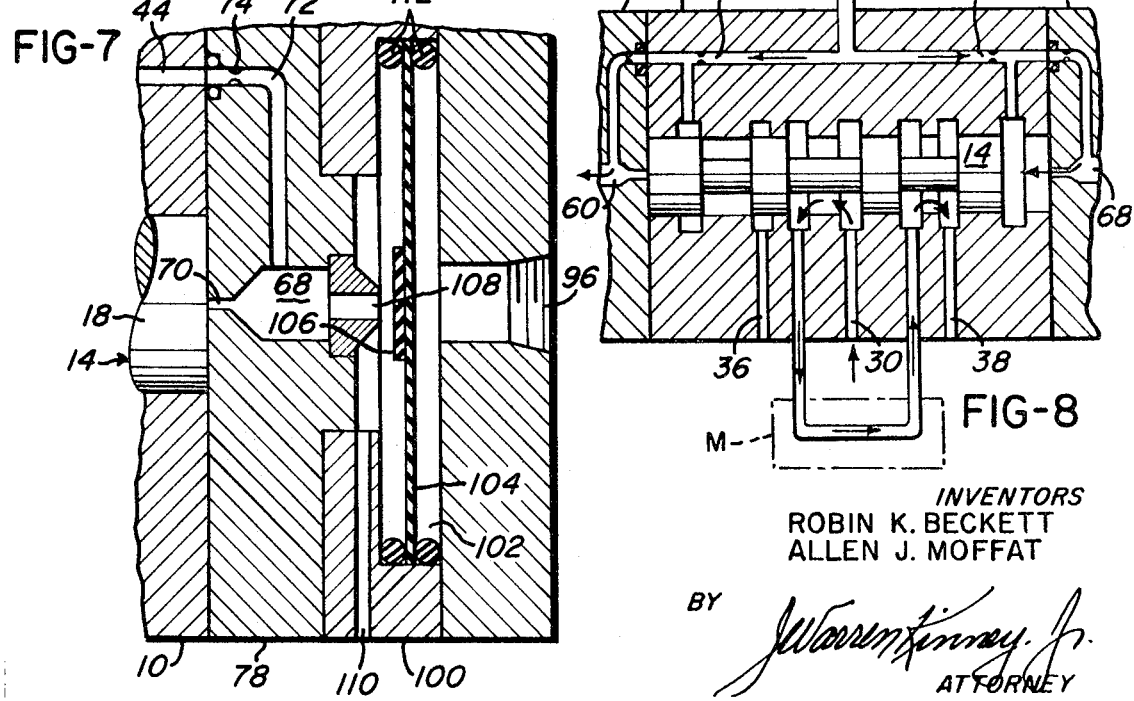

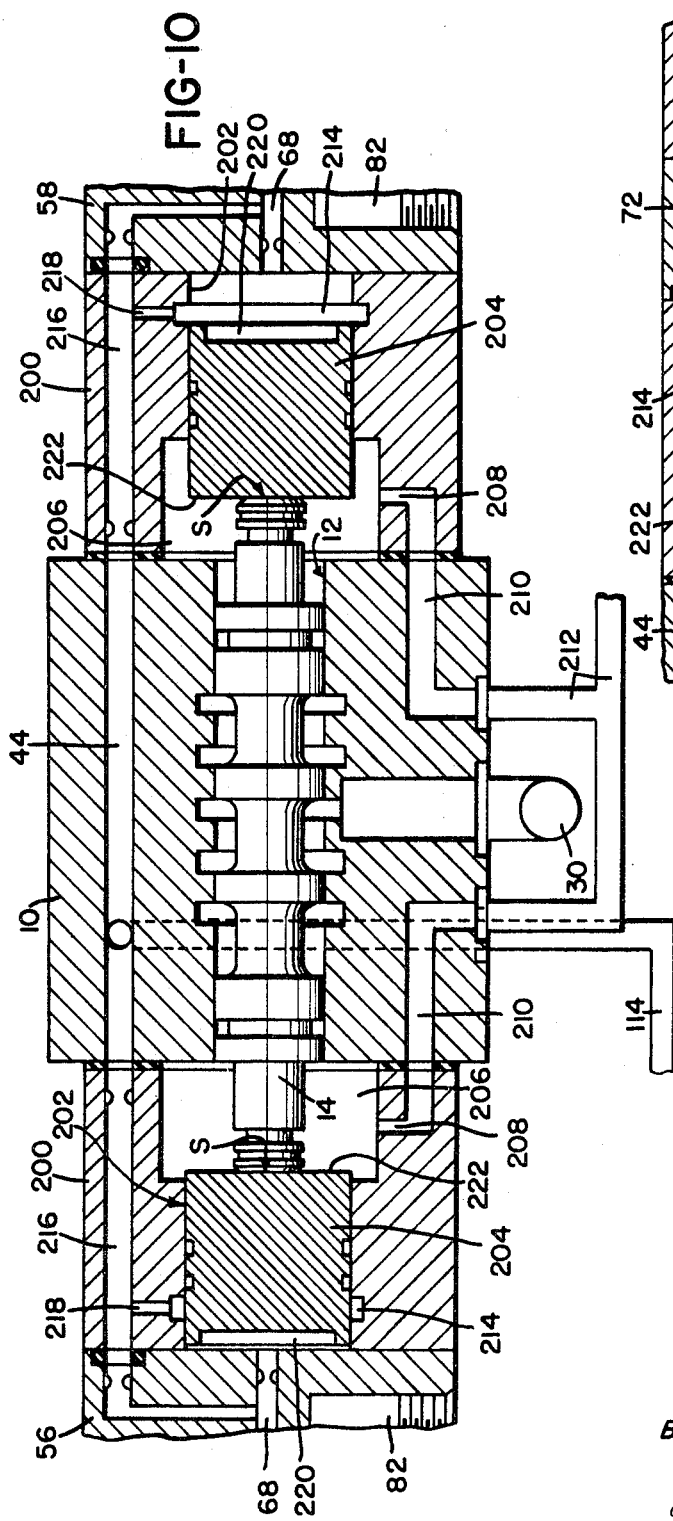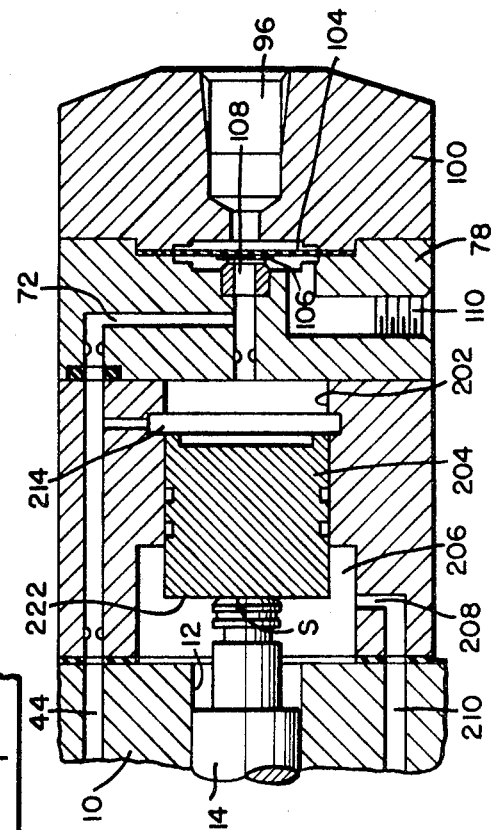

VALVE WITH HIGHLY SENSITIVE ACTUATING MEANS

This application is a continuation-in-part of our pending patent application Ser. No. 726,834, filed May 6, 1968 and now abandoned.

This invention relates to a valve and highly sensitive actuating means therefor. Such a valve may be used for controlling a flow of air or other fluid media under pressure emanating from any suitable source of supply. The invention is applicable particularly to valves of the axially shiftable spool type.

An object of the invention is to provide in a spool valve, simple and reliable means of a highly sensitive nature, for actuating the valve by shifting the spool thereof.

Another object of the invention is to provide improved means for fluidic actuation of a spool valve assuring instantaneous full shifting of the valve spool, and retention thereof in the shifted positions.

Another object of the invention is to provide a valve including fluidic actuator means, which very simply and economically may be applied to machines of various types, for effecting controlling such machines or other associated therewith, and providing for maximum safety of machine operation.

A further object of the invention is to provide a control valve and actuating means therefor, which is unitary and compact to a high degree, and which employs a minimum number of simple, yet durable, trouble-free working parts.

The foregoing and other objects are attained by the means described herein and illustrated in the accompanying drawings, in which:

FIG. 1 is a longitudinal cross section of a spool valve embodying the present invention, the spool being shifted to one end of its valving chamber.

FIG. 2 is a view similar to FIG. 1, showing the valve spool undergoing shifting, the spool being in an intermediate position within the chamber.

FIG. 3 is a view similar to FIG. 1, showing the valve spool shifted to the opposite end of the valving chamber, in comparison with FIG. 1.

FIG. 4 is a side elevation of the valve of FIG. 1, indicating connection thereof with a fluidic system actuating means.

FIG. 5 is a side elevation of the valve, showing an alternative form of actuating means.

FIG. 6 is a side elevation of the valve in slightly modified form, and indicating a still different form of actuating means.

FIG. 7 is an enlarged cross-sectional view of one end portion of the valve, disclosing an ultrasensitive operating fluid diverter.

FIG. 8 is a longitudinal cross section quite similar to FIGS. 1, 2 and 3, but illustrating a modified construction of the valve.

FIG. 9 is an enlarged cross-sectional view of an end portion of a valve similar to FIG. 7 illustrating a booster in conjunction therewith.

FIG. 10 is an enlarged cross-sectional view of a valve similar to FIG. 8 illustrating a booster in conjunction therewith.

The subject valve comprises a main body part 10, which conveniently may be an elongate block of metal axially bored to provide a chamber 12 within which may be axially shifted a nicely fitted valve spool 14. The spool may comprise opposite end lands 16 and 18, and one or more intermediate lands such as 20 and 22, which lands are spaced apart by reduced diameter portions of the spool at intervals to provide voids 24, 26 and 28. The lands of the spool are equal in diameter, and are fitted to the bore of chamber 12 with close tolerance to perform as movable valving elements for controlling fluid flow through a plurality of passages or ports in the valve body.

A passage or port 30 delivers air or other fluid under compression or pressure to the middle area of valve chamber 12, from whence said fluid may be directed to one or the other of two supply passageways 32 or 34, depending upon the position of the valve spool within chamber 12. For example, shifting of the spool to the right as in FIG. 1, establishes a fluid flow from port 30 to port 34 for activating a mechanism indicated conventionally at M. By shifting the spool to the left as in FIG. 3, the flow through mechanism M may be reversed, thereby to reverse operation of said mechanism. Mechanism M may be any type of machine, motor, or the like operable by pressured fluid, for example a double-acting air cylinder.

When the valve spool is shifted to the right, FIG. 1, fluid fed to mechanism M exhausts through exhaust port 36 by way of spool void 24. When the spool is shifted to the left as in FIG. 3, fluid is fed to mechanism M through port 32, and is exhausted in the reverse direction through port 34, spool void 28, and exhaust passageway 38. Passageways 36 and 38 may exhaust to atmosphere in some applications, particularly if the fluid exhausted is air. However, if the fluid exhausted at 36 and 38 is a liquid to be conserved, the passageways 36 and 38 may have connection with a reservoir and a pump in a closed system supplying liquid to input port 30. The FIG. 8 modification is well adapted to closed system operation, as will be explained later.

Since the primary purpose of the valve is to control delivery and exhaust of a fluid activating the mechanism M, the circuitry of said fluid may properly be termed the primary circuit, in which is included primary ports and passageways such as 30, 32, 34, 36, 38. The valve includes also secondary ports and passageways, and a secondary fluid circuit, presently to be explained.

In that form of the valve illustrated by FIGS. 1, 2 and 3, a secondary fluid circuit is provided, fed from the primary circuit through a shunt passage or duct 40, for controlling shifting movements of valve spool 14 in opposite directions within chamber 12. The shunt passage 40 may feed two branch passageways 42 and 44 which extend in opposite directions therefrom. Flow of fluid into the branch passageways may be regulated by an adjustable screw or needle 46 mounted upon the valve body as shown, if desired.

Each branch passageway is constricted, at locations such as 48, 48, to pass equal small amounts of fluid into valve spool chamber 12 at opposite ends thereof, through booster ducts 50 and 52 formed in the valve body near opposite ends thereof. Pressured fluid from a booster duct acts upon one end face 54 of the valve spool, once the spool has been shifted, to maintain the spool in the shifted position. In the shifted position of the spool, one booster duct will be closed off by a spool end head, while the other booster duct supplies fluid for biasing or detenting the spool to the shifted position. This is readily evident from FIG. 1, wherein duct 52 is closed off by spool head 18, while duct 50 supplies pressured fluid to the end areas 54 of the spool.

Opposite ends of valve body 10 may be machined to support in leakproof fashion, the orifice blocks 56 and 58 which may flatly abut the body ends. Block 56 has an open-ended through bore 60, whose inner open end is reduced to a small orifice 62 which is in constant communication with the adjacent end of spool chamber 12. A connecting passageway 64 places bore 60 in communication with branch passageway 42. Passageway 64 is constructed and orificed as at 66.

Orifice block 58 may be identical to orifice block 56 above-described. The open-ended through bore is denoted 68, and has the small orifice 70 in constant communication with the spool chamber at spool head 18. The connecting passageway 72 has an orifice 74 corresponding to orifice 66 in passageway 64 of block 56.

In the form illustrated by FIGS. 1, 2 and 3, the valve may be provided with two blocks or housings 76 and 78 fitted against the orifice blocks 56 and 58, respectively, and containing actuating or control means for initiating shifting of valve spool 14. The actuator blocks or housing 76 and 78 may be identical to one another, so that a description of one will suffice for the other also. Accordingly, block 76 may include a chamber 80 in the form of an open-ended bore, one end of which is normally in communication with the outer open end of orifice block bore 60. Chamber 80 also communicates with atmosphere through a bleed duct 82, which duct normally permits escape of secondary fluid flowing through the passageways 40, 42, 64, 60 and 80.

Within chamber 80 is a movable pressure-responsive control member 84, which in FIGS. 1 to 3, is in the form of a shiftable piston. In the FIG. 7 and FIG. 9 modification, such control member 84 is shown in the form of a flexible diaphragm. FIGS. 1 to 3, the piston slides axially within bored chamber 80, and supports upon its inner or forward end a plug or contactor 86 which, upon advancement of the piston, closes the adjacent open end of bore 68 as shown at the right in FIG. 2. Such closing or valving of bore 68, (also bore 60), may be momentary only; and as will be explained later, serves to initiate shifting of the valve spool 14 within chamber 12.

The plug or contactor 86 may be of rubber or other soft material, embraced within a socket or depression in the forward face of piston 84. The piston may be of any acceptable material, including metal, or a plastic such as Teflon which will slide easily within chamber 80. The cylindrical surface of the piston may be annularly grooved at a multiplicity of locations along its length, as at 88, whereby air entrapped by the grooves serves to minimize friction between the piston and the wall of bore 80, while at the same time forming a fluid seal opposing leakage of air lengthwise of the piston.

From the disclosure of FIG. 1, it is noted that fluid under pressure leaving the bore 68 impinges upon plug 86 and the surrounding end face of piston 84, to constantly yieldingly displace or detent the piston away from bore 68, so that fluid leaving said bore may normally bleed to atmosphere through duct 82. The end face of the piston surrounding plug 86, may advantageously be formed with an annular pocket or groove 90 to deflect the airstream leaving bore 68, whereby the kinetic energy of the stream is utilized to yieldingly urge the piston to a position of retraction from bore 68.

The construction of the actuator block or housing 76 may be identical to that of block or housing 78 at the opposite end of the spool valve body, in accordance with FIGS. 1, 2 and 3. In these drawing figures, the numerals 92 and 94 denote port blocks or plates fitted and secured against the exposed end faces of the actuator blocks or housings 76 and 78. The blocks or plates 92 and 94 are provided each with an entry port 96 for fluid to be delivered thereto at times, under light pressure. The fluid to be delivered to ports 96, (in alternation), may be a gas or a liquid, and may be either a sustained stream or a short puff or impulse, to initiate a shifting of the valve spool 14 as will be explained. The flow directed against a piston 84 through a port 96, may be referred to as a signal or signal impulse emanating from a fluidic system or other source of pressure or force, indicated conventionally at 98 upon FIG. 4.

Before proceeding with an explanation of FIGS. 5 through 8, the operation of the valve as depicted by FIGS. 1 through 4 will be recited to advantage.

It may be assumed that machine M, for example, is a double-acting air cylinder. A suitable source of air under pressure supplies air to inlet port 30. If valve spool 14 is disposed to the right, as in FIG. 1, air from port 30 will be fed to machine M through passageways 26 and 34, and will exhaust from machine M through passageways 32, 24 and 36. This circuit is the primary circuit.

A portion of the air from supply port 30 is shunted constantly via duct 40, to branch passageways 42 and 44, as secondary circuit air. Branches 42 and 44 deliver air to booster ducts 50 and 52, and also to connecting passageways 64 and 72 which feed the bores 60 and 68, respectively. From bore 60, air moves in two directions, one stream passing out of the valve to atmosphere through bleed duct 82, and the second stream passing through orifice 62 to an end of spool chamber 12. At the same time, air passes to the opposite end of the spool chamber through orifice 70, and a portion escapes through the bleed duct 82 of block 78.

From the foregoing, it will be understood that secondary air pressure is constantly maintained against the outer end face of spool head 16, by way of duct 50 and orifice 62, will air-detent the valve spool toward the right in FIG. 1. At the same time, secondary air will flow also from passageway 44 through 72 and into bore 68, whence it will vent to atmosphere through the chamber 80 and bleed duct 82 of control block 78. Thus, air will vent constantly through the bleed ducts 82, 82 of the control blocks 76 and 78, preferably at a very limited rate of discharge.

To shift the valve spool 14 to the left, for the purpose of reversing flow of fluid through M according to FIG. 3, one of two procedures may be selected. One procedure is that of closing the bleed duct 82 of block 78, as by means of the human finger or otherwise, in order to divert air through orifice 70 with a pressure buildup sufficient to shift the spool 14 to the left. The second procedure involves shifting the piston 84 of block 78 physically to the left, as by means of pressure of fluid introduced through port 96 of port block 94, to close the plug 86 upon the outer end of bore 68 and thereby effect a pressure buildup against spool head 18 through orifice 70, sufficient to shift the valve spool.

Piston 84 may be shifted mechanically, rather than pneumatically or hydraulically, if desired, for actuating the valve. A mere momentary advancement of a piston, or a momentary closing of a bleed duct 82, will suffice to effect the valve spool shift. Once shifted, the spool will be kept fluid-detented by pressure constantly acting upon an end of the spool.

FIG. 2 shows how the right-hand piston 84 may be advanced to close off the bore 68 and bleed duct 82, to enforce a shifting of valve spool 14 to the left. It must be understood that the valve spool will not come to rest at the FIG. 2 position, but will move on to the position of full advancement within the spool chamber, as in FIG. 3. When moved to the FIG. 3 position, the valve spool is kept biased or detented to the left limit of movement, by the presence of pressured fluid upon the face 54 of the spool head 18. This pressure detenting of the valve spool advantageously stabilizes the spool against inadvertent shifting by vibration or impacts to which the valve body might be exposed during use, and avoids the possibility of having the spool stop in center position. The spool will never remain in center position, because at that position of the spool, one or the other of the ducts 50 or 52 will be exposed to an end of chamber 12, thereby to admit operating pressure for unbalancing the spool and driving it to one extreme position or the other.

The valve as disclosed may be actuated by introducing very light pressure of air or liquid at the fluid ports 96. In typical small valves, the operating pressure has been measured at small fractions of one pound per square inch.

The operating pressure required for actuating the valve may be reduced still further by resorting to the structure of FIG. 7, wherein a modified form of actuator block or housing 100 is substituted for the block or housing 78 of FIG. 1. According to FIG. 7, the block or housing 100 is constructed of a relatively thin plate recessed in one face to provide a chamber 102 in which may be supported a flexible diaphragm 104. The diaphragm may carry a plug or contactor 106 corresponding to member 86 of FIG. 1, for closing the open outer end 108 of bore 68, thereby to produce a pressure buildup in duct 72, bore 68, and orifice 70, for displacing valve spool 14 to the left in FIG 7.

When diaphragm 104 is not under stress, secondary air from passageways 44 and 72 flows constantly through orifice 108 and is exhausted to atmosphere through bleed duct 110. However, when fluid under pressure at 96 forces the diaphragm plug 106 against ferrule 108, the valve spool is induced to shift as above explained. In constructing the modified valve of FIG. 7, no changes need be made in the body 10. The diaphragm 104—106 may be formed of any flexible material commonly used for diaphragms, soft rubber being one such material. The diaphragm may be supported at its outer periphery between rubber rings 112 which seal it against leakage of fluid from one face of the diaphragm to the other.

FIG. 8 suggests a modification of valve body 10, wherein the branch passageways 42 and 44 are supplied with operating fluid from a source 114 which may be separated from inlet passage 30. Otherwise stated, there is in FIG. 8 no shunt connection between inlet passage 30 and the branch passageways 42 and 44. By the means of FIG. 8, the fluid used for controlling the valve spool movements may be a fluid different than that supplied to mechanism M. For example, one of the fluids may be a gas, and the other a liquid. The modified body of FIG. 8 may be equipped with the piston-type control means of FIG. 1, or the diaphragm type of FIG. 7, as desired.

FIGS. 4, 5 and 6 illustrate a few of many possible applications of the valve. In FIG. 4, the numerals 116 and 118 indicate tubes connected to the ports 96 of the valve, for conveying impulses to the piston 84 or to diaphragms such as 104, FIG. 7. From a fluidic system 98, a gas or a liquid pressure may be released to tube 116 for initiating a shifting of the valve spool as previously explained. The other tube 118 also may be connected in the same fluidic system, or in a different system if desired. As was previously pointed out herein, shifting of the valve spool may be initiated manually or mechanically, as well as pneumatically or hydraulically, and this suggests the possibility in FIG. 4 of omitting the tube 118 and applying manual, mechanical, or electrical means to shift the valve spool in one direction, while employing fluidic means to shift it in the opposite direction. Shifting of the spool may be initiated also by momentarily covering one of the bleed ducts 82, as previously explained.

According to the example of FIG. 5, a port 96 of the valve is connected to an air pressure supply pipe 120, which includes one or more bleed ducts or orifices 122, 122. The ducts or orifices are of a capacity such as to normally bleed off substantially all of the air delivered by source 124, thereby to normally avoid activation of the valve spool control 84, (or 104), until such time as an operator closes the orifices 122. The operator may close said orifices by placing his fingers over them, thereby to direct the pressure of air in pipe 120 onto the control member 84 or 104. The arrangement here disclosed may be used in operation of punch presses or similar machines, wherein safety of operation depends upon disposition of the attendant's fingers over the orifice 122 at a safe distance from the punching dies.

In the foregoing example, closing the orifices 122 initiates shifting of the valve spool in one direction to effect activation of the press or similar machine M. Shifting of the valve spool in the opposite direction to normalize machine M, may be effected by manipulating the piston or diaphragm control means at that end of the valve which is opposite to pipe 120. Such manipulation as previously suggested, may be accomplished manually, mechanically, electrically, or by fluid pressure means.

According to the example of FIG. 6, the port blocks and the control housings have been removed from the valve body, leaving the orifice blocks 56 and 58 in position to support two straight open-ended tubes 126 and 128. Air under light pressure may normally escape from the tubes 126 and 128, which are fed from the passageways 42—60 and 44—68 of FIG. 8, or from the corresponding passageways of FIG. 1. As long as the air escapes from tubes 125 and 128, no activation of the valve spool 14 takes place; but if one tube such as 128 meets a stop 132 which plugs the end of one tube, pressure of air will build up immediately in tube 128 and consequently in bore 68 with which the tube communicates, thereby to impose pressure of fluid upon one end face of the valve spool sufficient to shift the spool. Mechanism M accordingly will be placed in operation by virtue of fluid directed thereto through the valve spool.

In a manner similar to that above related, tube 126 of FIG. 6 may meet and be closed by a stop or plug 130, to initiate shifting of the valve spool in reverse direction, for again actuating the mechanism M.

The open ends of tubes 126 and 128 may be closed or plugged alternately, by mounting the valve body 10 upon a reciprocative carriage of machine M, with the stops 130 and 132 properly located to close the tube ends alternately as the carriage reciprocates between opposite limits. In some instances the stops may move with the carriage, while the valve body is stationarily supported on the machine frame.

In all applications of the valve involving fluidic or other low pressure signals for initiating operation thereof, the pressure of fluid employed may be exceedingly light, such as for example, the pressure of one-half inch to 3 inches head of water. Valves of this type can be made very small if necessary. In the example illustrated by FIG. 1, the diameter of the valve spool may approximate one-half inch, with a stroke of about seven thirty-seconds inch. In such a valve, uniformly satisfactory results have been obtained when the orifices at 48, 66 and 74 measure 0.032 inch, while those at 62 and 70 measure 0.022 inch, however such dimensions are not critical and in certain instances they may be equal. If the bore 68 in provided with a seat or ferrule, as at 108 in FIG. 7, the inside diameter of the opening within the seat or ferrule may approximate 0.050 inch.

In a valve of the size mentioned above, the use of a diaphragm such as 104 in FIG. 7, may be preferred, particularly if the pressure available to initiate shifting of the valve spool is so light as to be nearly imperceptible, that is, a pressure equal to about one-half inch head of water. In that event, the diaphragm diameter may approximate 1 inch, or more.

In FIGS. 9 and 10 we have illustrated the valving means of the invention in combination with boosters in the form of pistons interposed between the ends of the valve spool and the adjacent orifice blocks 78, 56 and 58; said pistons serving to substantially increase the actuating force applied to the end of the valve spool by the same spool-actuating pressures contemplated in FIGS. 1—3, 7 and 8.

Said boosters are interposed in the secondary fluid circuits by which the spool is actuated to control fluid in the primary circuit of the valve.

With particular reference now to FIGS. 9 and 10 those elements which correspond structurally and functionally with similar parts of FIGS. 7 and 8 bear the same reference numerals.

In FIGS. 9 and 10 the numeral 200 denotes a block having an axial bore 202 for the reception of a piston 204 slidably mounted therein. The inner end of bore 202 is enlarged as at 206 to provide a sump chamber having an outlet 208 in the bottom thereof which constitutes a free atmospheric drain for any fluid that might leak into said chamber from the primary circuit of the valve.

Outlet 208 is connected through suitable conduits 210 in body 10 and piping 212 secured thereto to a suitable sump, not illustrated.

A so-called latching groove or chamber 214 is provided intermediate the length of bore 202 whereby to be disposed beyond, that is, not covered or obstructed by the piston when in the fully advanced position illustrated in FIG. 9 and at the right end of FIG. 10.

The latching groove or chamber 214 is in open communication with passageway 216, which is an extension of passageway 44 in body 10, by passageway 218; and chamber 214 is also in open communication with the outer portion of bore 202 and with bore 68 of orifice block 56 and 58 of FIG. 10 and bore 68 of orifice block 78 of FIG. 9.

In the preferred embodiment, the rear portion of the piston is centrally recessed as at 220 to provide an enlarged pocket. The forward surface 222 of the piston is adapted to abuttingly engage the outer surface S of the end of the spool.

With particular reference now to FIG. 10 it will be noted that the spool has been shifted to the left by reason of movement of the right piston 204 to the left incident to the application of air pressure against the rear surface thereof. Such movement results in moving the left piston to the left with the concurrent blockage or closing of the left latching groove or chamber 214 which automatically cuts off communication between the left passageway 218 and the interior of left bore 202.

As the right piston 204 moves to the left the right latching groove or chamber 214 is opened for placing the right passageway 218 in open communication with the outer surface of the right piston. The air pressure against the right piston from the right passageways 218 and 68 effectively maintains the spool and both pistons at the left end of their respective travels against accidental or unintentional movement to the right.

As clearly illustrated in FIGS. 9 and 10 the diameter of pistons 204 is considerably larger than the diameter of spool-bore 14 of body 10 whereby the spool shifting power or the total actuating force applied to a spool is greatly amplified without increasing the overall diameter of the booster housing 200 beyond that of the orifice blocks 56 and 58. Phenominal and universally satisfactory results have been obtained when pressures as low as ½-inch water are introduced into ports 96, wherein the diameter of piston 204 is three-fourths inch and the diameter of the spool-bore 12 is one-half inch. The diameter of the piston 204 or piston chamber 202 should exceed by at least 20 percent the diameter of the spool bore 12 of body 10.

We claim:

1. A fluid control valve comprising in combination: a body having an elongate body bore, and a plurality of passageways terminating in said bore and adapted to convey a pressured primary operating fluid between said bore and a machine to be activated by said fluid; an elongate valve spool reciprocable in said body bore, said spool having opposite end faces and end lands, and a plurality of reduced portions intermediate said lands for placing different ones of said passageways in fluid intercommunication with one another upon shifting of the valve spool to opposite ends of the body bore; the valve body having a secondary passageway system means for introducing a fluid under pressure constantly to said secondary passageway system, said secondary passageway system including an open end passageway bore having at one end thereof a constricted orifice for selectively establishing a secondary fluid pressure in the body bore and against one end face of the valve spool, the opposite end of said passageway bore being open so as to bleed secondary fluid selectively constantly to atmosphere from said secondary passageway system; said bleed opening being selectively closable to produce a pressure buildup in that body bore end which is supplied with secondary fluid through said constricted orifice, for increasing the pressure of fluid upon said one end face of the valve spool, to shift the valve spool away from said orifice and means for holding said valve spool in a predetermined position away from said orifice regardless of bleed opening state including supply passage means opening to said body bore and selectively closed by one of said lands when the valve spool is in a position adjacent said orifice and selectively opened by said one land when the valve spool is in said position away from said orifice.

2. The valve as specified by claim 1, wherein the secondary passageway system is supplied with pressure fluid shunted from one of the primary passageways.

3. The valve as specified by claim 1, wherein the combination includes means movable interiorly of the valve for selectively closing the bleed opening.

4. The valve as specified by claim 3, wherein the means last mentioned includes a flexible diaphragm having opposite faces, one of which faces in flexing closes against the aforesaid bleed opening to close said opening; and means for directing a fluid under pressure selectively against the opposite face of said diaphragm, for flexing said one face against said bleed opening.

5. The valve as specified by claim 1, wherein is included in combination therewith means for selectively closing said bleed opening.

6. The valve as specified by claim 5, wherein the last mentioned means includes a control member shiftable from a normally retracted position, to an advanced position in closing relation with said bleed opening; a source of pressured fluid including a supply pipe for directing fluid to the control member tending to pressure-advance said control member, said pipe including at least one bleed orifice normally releasing pressured fluid to such an extent as to diminish the pressure upon the control member to a nonoperative value, said pressure upon the control member being increased to an operative value by closing of the bleed orifice associated with said supply pipe.

7. The valve as specified by claim 1, wherein the constricted orifice directing secondary fluid into the body bore is of a size approximating 0.022 inch in diameter, and the flow fed to said constricted orifice and to said open-ended passageway bore is limited by a constriction approximating a diametral dimension of 0.032 inch.

8. The valve as specified by claim 7, wherein the combination includes means for regulating the introduction of fluid to said secondary passageway system.

9. The valve as specified by claim 1, wherein the combination includes fluid-pressure actuated means for selectively closing the bleed opening.

10. The valve as specified by claim open-ended wherein said fluid-pressure actuated means comprises a control housing fixed relative to the valve body, said housing having an open-ended piston chamber one end of which is in communication with the aforesaid opposite end of the passageway bore; a piston reciprocable within said piston chamber movable from a normally retracted position, to an advanced position in closing relationship with said passageway bore; a bleed duct in said housing conveying to atmosphere the fluid escaping from said passageway bore when the piston is retracted; and means for directing an actuating fluid against an end of said piston for shifting said piston to the advanced position.

11. A fluid control valve comprising in combination: a body having an elongate body bore, and a plurality of passageways terminating in said bore and adapted to convey a pressured primary operating fluid between said bore and a machine to be activated by said fluid; an elongate valve spool reciprocable in said body bore, said spool having opposite end faces and end heads, and a plurality of voids intermediate said heads for placing different ones of said passageways in fluid intercommunication with one another upon shifting of the valve spool to opposite ends of the body bore; the valve body having a secondary passageway system, means for introducing a fluid under pressure constantly to said secondary passageway system, said secondary passageway system including an open end passageway bore having at one end thereof a constricted orifice for establishing a secondary fluid pressure in the body bore and against one end face of the valve spool, the opposite end of said passageway bore being open so as to bleed secondary fluid constantly to atmosphere from said secondary passageway system; said bleed opening being selectively closable to produce a pressure buildup in that body bore end which is supplied with secondary fluid through said constricted orifice, for augmenting pressure of fluid upon said one end face of the valve spool, to enforce shifting of the valve spool away from said orifice, a booster duct for directing fluid under pressure from the secondary passageway system to that body bore end which is supplied through said constricted orifice, and including fluid-pressure actuated means for selectively closing the bleed opening.

12. The valve as specified by claim 11, wherein said fluid-pressure actuated means comprises a control housing fixed relative to the valve body, said housing having an open-ended piston chamber one end of which is in communication with the aforesaid opposite end of the passageway bore; a piston reciprocable within said piston chamber movable from a normally retracted position, to an advanced position in closing relationship with said passageway bore; a bleed duct in said housing conveying to atmosphere the fluid escaping from said passageway bore when the piston is retracted; and means for directing an actuating fluid against an end of said piston for shifting said piston to the advanced position.

13. A fluid control valve comprising in combination: a body having an elongate body bore, and a plurality of passageways terminating in said bore and adapted to convey a pressured primary operating fluid between said bore and a machine to be activated by said fluid; an elongate valve spool reciprocable in said body bore, said spool having opposite end faces and end heads, and a plurality of voids intermediate said heads for placing different ones of said passageways in fluid intercommunication with one another upon shifting of the valve spool to opposite ends of the body bore; the valve body having a secondary passageway system, means for introducing a fluid under pressure constantly to said secondary passageway system, said secondary passageway system including an open end passageway bore having at one end thereof a constricted orifice for establishing a secondary fluid pressure in the body bore and against one end face of the valve spool, the opposite end of said passageway bore being open so as to bleed secondary fluid constantly to atmosphere from said secondary passageway system; said bleed opening being selectively closable to produce a pressure buildup in that body bore end which is supplied with secondary fluid through said constricted orifice, for augmenting pressure of fluid upon said one end face of the valve spool, to enforce shifting of the valve spool away from said orifice, an end head of the spool closing the booster duct and terminating flow of secondary fluid therethrough whenever said end head of the spool is in close proximity to the constricted orifice, including fluid-pressure actuated means for selectively closing the bleed opening.

14. The valve as specified by claim 13, wherein said fluid-pressure actuated means comprises a control housing fixed relative to the valve body, said housing having an open-ended piston chamber one end of which is in communication with the aforesaid opposite end of the passageway bore; a piston reciprocable within said piston chamber movable from a normally retracted position, to an advanced position in closing relationship with said passageway bore; a bleed duct in said housing conveying to atmosphere the fluid escaping form said passageway bore when the piston is retracted; and means for directing an actuating fluid against an end of said piston for shifting said piston to the advanced position.

15. A fluid control valve comprising in combination: a body having an elongate body bore, and a plurality of passageways terminating in said bore and adapted to convey a pressured primary operating fluid between said bore and a machine to be activated by said fluid; an elongate valve spool reciprocable in said body bore, said spool having opposite end faces and end heads, and a plurality of voids intermediate said heads for placing different ones of said passageways in fluid intercommunication with one another upon shifting of the valve spool to opposite ends of the body bore; the valve body having a secondary passageway system, means for introducing a fluid under pressure constantly to said secondary passageway system, said secondary passageway system including an open end passageway bore having at one end thereof a constricted orifice for establishing a secondary fluid pressure in the body bore and against one end face of the valve spool, the opposite end of said passageway bore being open so as to bleed secondary fluid constantly to atmosphere from said secondary passageway system; said bleed opening being selectively closable to produce a pressure buildup in that body bore end which is supplied with secondary fluid through said constricted orifice, for augmenting pressure of fluid upon said one end face of the valve spool, to enforce shifting of the valve spool away from said orifice, and a booster duct for directing fluid under pressure from the secondary passageway system to that body bore end which is supplied through said constricted orifice, the secondary passageway system being supplied with pressured fluid shunted from one of the primary passageways aforesaid.

16. A fluid control valve comprising in combination: a spool valve including a body having a valve-spool bore extending therethrough; an elongate valve spool reciprocable in said bore and having opposite end faces; a spool actuator secured to and carried by opposite ends of said body, said actuators each including a booster block having an open-ended piston chamber one end of which is in communication with an end of said body bore; a piston in said chamber having a forward face in abutting relationship with an end face of said spool; said piston having a diameter substantially greater than said valve spool, a pressure chamber for the continuous reception of fluid media under pressure in open communication with a rear face of said piston and also vented to the atmosphere, whereby restriction or interruption of the flow of fluid media through said vent will divert all of the fluid media within said chamber against the rear face of the piston for shifting said piston and the spool to the other end of its stroke.

17. A valve as specified by claim 16, wherein the diameter of said pistons is at least 20 percent greater than the diameter of the valve-spool receptive bore.

18. A valve as specified by claim 16, wherein the said piston chambers include a latching groove, said groove disposed relative to the overall travel of the piston in said chamber whereby to be placed in open communication with the piston chamber and the rear face of said piston when the piston is fully advanced toward the valve body, and whereby to be closed from communication with said chamber when said piston is retracted.

19. A valve as specified in claim 18, which includes means for continuously supplying fluid media under pressure to the latching groove of each of said piston chambers.

20. A valve as specified in claim 19, wherein the presence of fluid media under pressure against the rear face of the piston holds the spool at the opposite end of its stroke against accidental or unintentional displacement.

21. A valve as specified in claim 16, which includes an atmospheric vent for that portion of the piston chamber adjacent the valve body.

22. A valve as specified in claim 16, which includes a drain line for the outer end of the body bore and the adjacent end of the piston chamber.

23. A valve as specified in claim 16, wherein that end of the piston chamber adjacent the valve body is provided with a sump chamber, and a drain line in communication therewith.